Aug. 25, 1964 G. SIM 3,145,919

CODE ALTERING DEVICE

Filed Aug. 16, 1962 2 Sheets-Sheet 1

INVENTOR
GORDON SIM

BY J.J. Hamill

ATTORNEY

INVENTOR
GORDON SIM

BY [signature]

ATTORNEY

United States Patent Office 3,145,919

Patented Aug. 25, 1964

3,145,919

CODE ALTERING DEVICE

Gordon Sim, Northbrook, Ill., assignor to Teletype Corporation, Skokie, Ill., a corporation of Delaware Filed Aug. 16, 1962, Ser. No. 217,490
6 Claims. (Cl. 234—22)

This invention relates to a perforator responsive to telegraph input signals, and more particularly to a perforator having means for altering a given telegraph input signal as it is being recorded.

When monitoring a telegraph message by means of a tape perforator, such as that shown in the copending application of Gordon Sim and Rolf Thienemann, entitled Tape Perforator, Serial No. 217,458, filed of even date, herewith, it is usually desired to delete from the record tape the recording of the "who are you" signal that is normally sent preceding the message to ascertain the identity and availability of the distant station. The reason for deleting the "who are you" signal from the record tape is that, during a later transmission from the record tape, the transmission of the recorded "who are you" signals will trigger the remote station's answer-back mechanism, which answer-back mechanism will transmit its identity concurrently with the continued transmission of the signals from the record tape. Thus, an overlapping transmission of signals results; and this overlapping transmission of signals will, of course, cause mutilation of the recorded signals as they are transmitted until such time as the distant station's answer-back mechanism ceases to function.

A previous prior art manner of suppressing the recording of the "who are you" signals in a message tape necessitated the suspending of the feeding of the record tape after the punching of a "who are you" signal and then, since tape feeding is interrupted, overpunching the "who are you" signal with the normally following letters signal. Since the code combination for letters has a perforation in each level, the "who are you" signal is effectively deleted since only the letters code combination appears in the record tape.

However, when suppressing the tape feed mechanism and overpunching with a subsequent letters signal, problems are encountered in timing the disabling and enabling of the feed mechanism. Accordingly, the present invention eliminates these difficulties of the prior art by causing additional perforations to be punched in the record tape concurrently with the recording of the "who are you" or answer-back signal in the record tape thereby altering the recording of the answer-back signal to that of another signal.

An object of the invention is to provide a perforator with an auxiliary punch pin actuating mechanism operable to modify a selected input code combination.

Another object of the invention is to recognize an input code combination to a perforator and cause operation of additional punches thereby recording a code combination other than the input code combination.

Another object of the invention is to effectively delete an answer-back code combination in a tape being perforated by converting the answer-back code combination in a message tape to a letters code combination by actuating all of the punches rather than by suspending the tape feed and overpunching with a succeeding letters character.

A feature of the invention is the provision in a perforator of an auxiliary punch pin actuating means for recognizing a given code combination and for actuating additional, selectively encoded punch actuating levers to punch additional perforations thereby resulting in a new code combination being recorded.

According to the preferred embodiment of the invention, electrical telegraph input signals cause the permutative arrangement of settable mechanical input elements. Sensing levers detect the permutative arrangement of the input elements and operate punch pin actuating levers to perforate the input code combination. Additional sensing levers detect the arrangement of elements representative of an answer-back code combination and cause the rotation of a bail situated beneath the punch pin actuating levers to actuate punch pin actuating levers in addition to those levers operating the punch pins to record the answer-back code combination. Those punch pin actuating levers not responding to the answer-back input signals have dependant tines thereon in alignment with the bail whereby upon rotation of the bail the tines are engaged by the bail and the punch pin actuating levers are moved to reciprocate their associated punch pins to perforate additional perforations in the message tape. Preferably, all of the punch pin actuating levers that are not actuated during recording of an answer-back signal have tines thereon and are operated by the bail. Thus, all of the punch pins are actuated and perforate a hole in each level thereby recording a letters code combination for an answer-back input code combination.

A complete understanding of the invention may be had from reference to the following description when considered in conjunction with the drawings wherein.

Figures 1, 2, 3:
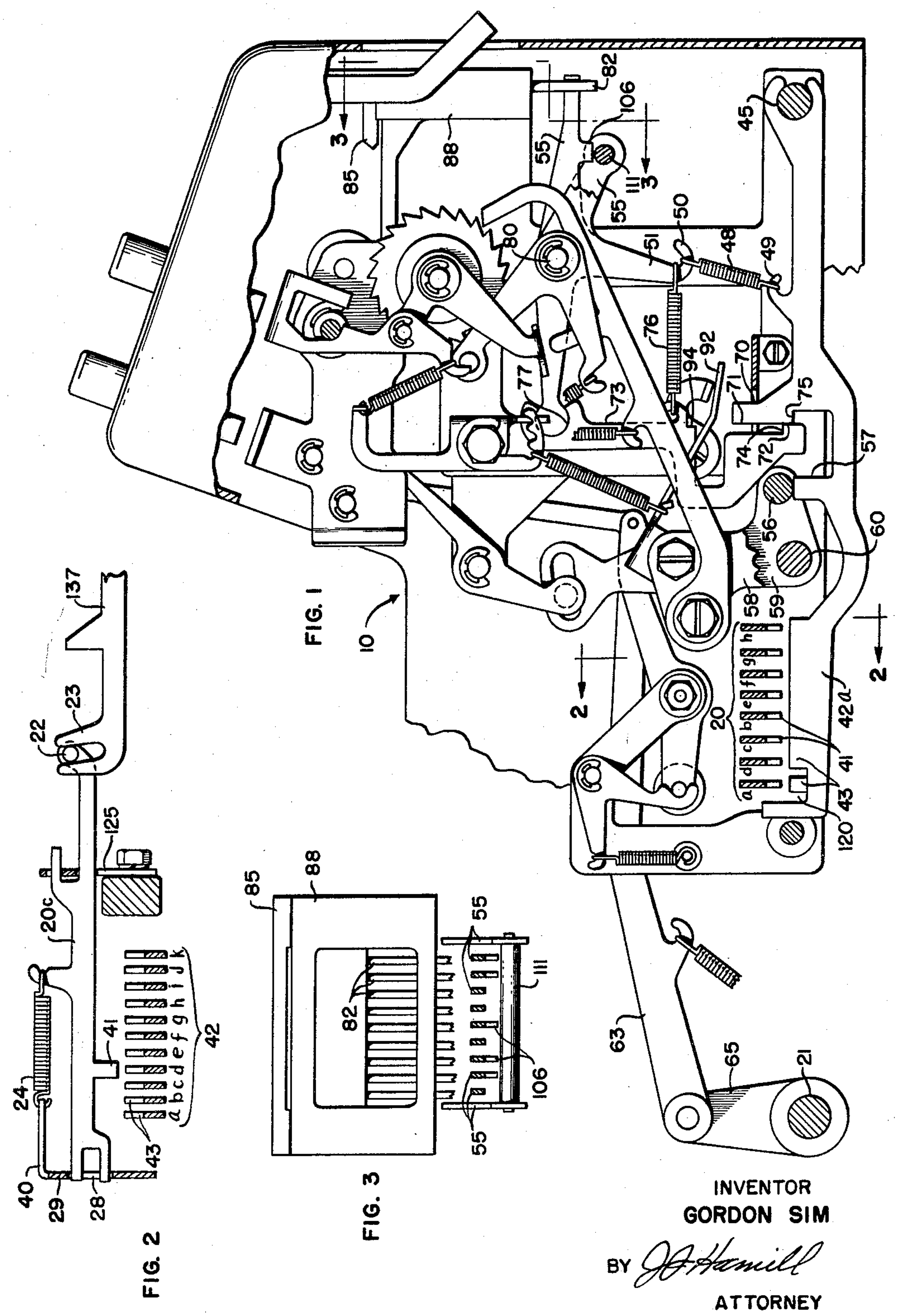
FIG. 1 is a vertical section view of the tape perforator having means thereon for altering a given input code combination according to the preferred embodiment of the invention.
FIG. 2 is a sectional view of a code bar and of a code bar extension taken substantially along line 2—2 of FIG. 1 in the direction of the arrows.
FIG. 3 is a sectional view of the punch pin actuating levers taken substantially along the line 3—3 of FIG. 1 in the direction of the arrows.

The tape perforator is only partially and briefly described hereinafter since the tape perforator is described in detail and claimed in the aforementioned copending application of Sim et al. which is hereby incorporated by reference and made a part of this disclosure as though reproduced fully herein. FIGS. 1 and 2 of the present disclosure are substantially identical to FIGS. 3 and 5 of the copending application of Sim et al. and for a more complete understanding of the operation of the perforator common reference numerals are used herein for the elements that are common to both.

Referring to FIG. 1 of the present disclosure, there is shown a tape perforator 10 that receives binary input information from each of eight code bar extensions 20*a*–20*h*. The code bar extensions 20*a*–20*h* are actuated by code bars 137 (FIG. 2) responding to a selector mechanism of a printing telegraph page printer disclosed in the copending application of W. J. Zenner, Serial No. 159,330, filed December 14, 1961.

As best seen in FIG. 2, the code bars 137 have a fork 23 partially encircling a pin 22 carried on the right-hand extremity of each of the code bar extensions 20*a*–20*h*. Code bars 137 and code bar extensions 20*a*-20*h* are biased leftwardly as seen in FIG. 2 by a spring 24 connected between an upward extension on each of the code bar extensions 20 and a spring hanger 40 that is secured to the frame of the perforator 10. The code bar extensions 20 are guided and supported for slidable movement at one end by an upstanding guide 125 having a slot therein for each of the code bar extensions 20 and at the other end by slots 28 in a bracket 29 on which the spring hanger 40 is mounted.

Figures 4, 5:
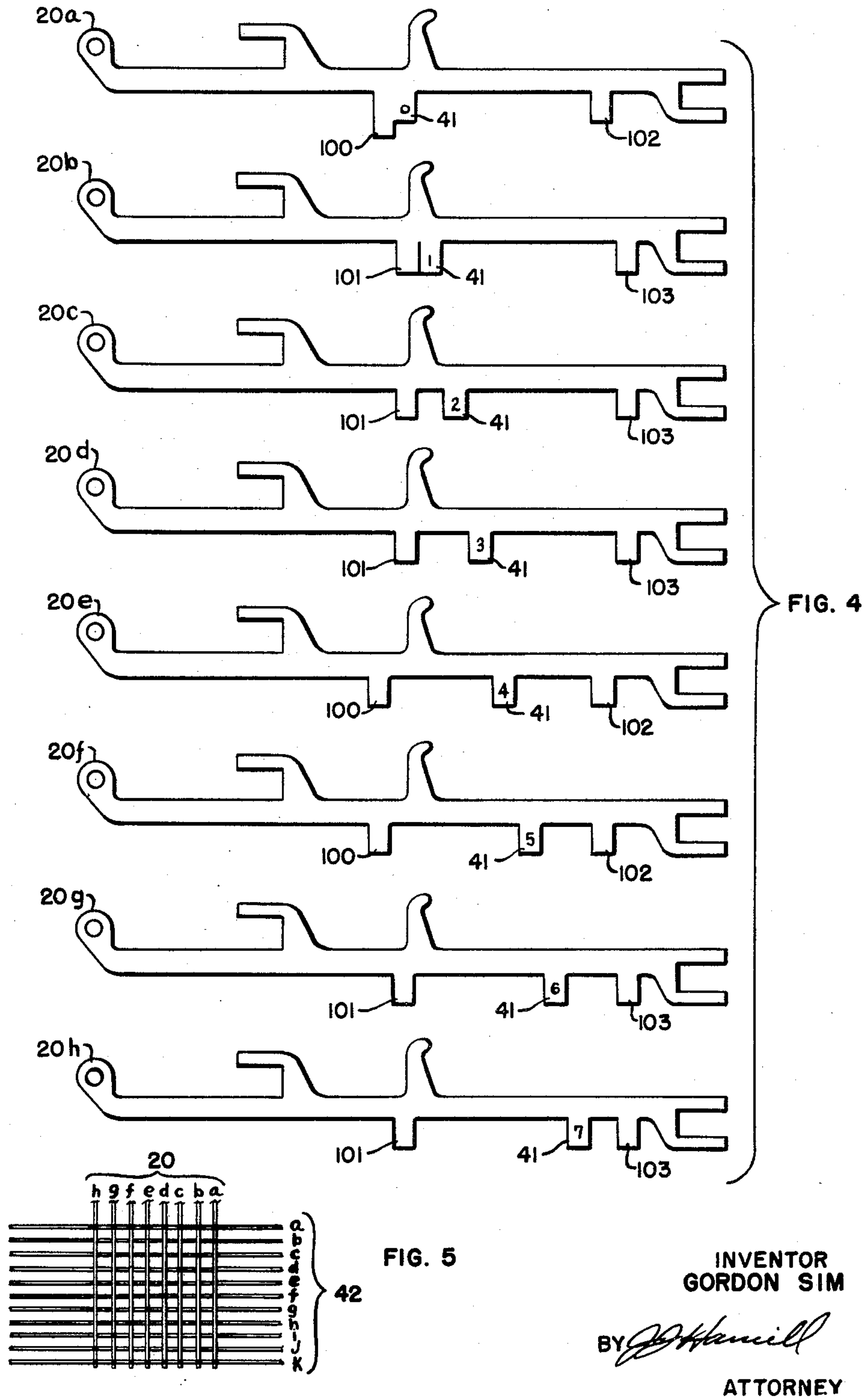
FIG. 4 is an expanded view showing the encoding of the code bar extensions according to the preferred embodiment of the invention.
FIG. 5 is a diagrammatic illustration of the relationship of the code bar extensions to the code bar sensing levers.

As clearly shown in FIG. 1, eight code bar extensions 20$a$–20$h$ provide an eight level input to the perforator 10 for a presently used eight level code. The configuration of each of the eight code bar extensions 20$a$–20$h$ is shown in FIG. 4. The code bar extensions 20$a$–20$h$ have dependant tines 41 which have been consecutively designated by numerals 0 to 7. The tines 41 are progressively displaced, the width of one tine to the right, e.g. the tine 41 designated by the numeral 1, in FIG. 4, is displaced the width of one tine to the right of the tine 41 designated by the numeral 0. Each of the tines 41 of the code bar extensions 20$a$–20$h$ co-operate with a matching tine 43 on one of the code bar sensing levers of the code bar sensing levers 42$a$–42$k$.

The code bar sensing levers 42$a$–42$k$ are pivotally supported on a shaft 45 for rotatable movement and are urged upwardly by a contractile spring 48 attached between a hook 49 on each of the code bar sensing levers and a hook 50 on a lever arm 51. The contractile spring 48 urges each of the sensing levers 42$a$–42$k$ upwardly into engagement with an oscillatable driving bail 56 carried on a pair of spaced bail arms 58 and 59.

The driving bail 56 is shown in its stop or quiescent position in FIG. 1 and in this position it holds the code bar sensing levers 42$a$–42$k$ and their respective upwardly extending tines 43 from sensing engagement with the dependant tines 41 on the code bar extensions 20$a$–20$h$. As shown in FIG. 1 there is sufficient clearance between the opposing tines 41 and 43 to permit the selective movement of the code bar extensions 20$a$–20$h$ to assume either one of two binary positions. That is, if the selector mechanism actuates the code bar 137 to a marking position, its associated code bar extension 20 and the dependant tine 41 thereon are moved one position to the left as shown in FIG. 2.

In the specific example shown in FIG. 2, the code bar extension 20$c$ has a dependant tine 41 thereon positioned over the upstanding tine 43 on code bar sensing lever 42$d$ when the code bar 137 is in its rightward or spacing position. When the code bar 137 moves to the left to its marking position, dependant tine 41 on associated code bar extension 20$c$ moves one position to the left and is no longer in matching engagement with the upstanding tine 43 on code bar sensing lever 42$d$. While the dependant tine 41 is now positioned over the code bar sensing lever 42$c$, it does not control the operation of code bar sensing lever 42$c$ since its tine 41 is not matched with the upstanding tine 43 on code bar sensing lever 42$c$. The dark intersections of the orthogonal lines in FIG. 5 indicate the matching of the tines 41 of the code bar extension 20$a$–20$h$ with the tines 43 on the code bar sensing levers.

As should be apparent from FIG. 5, there are eight code bar extensions 20$a$–20$h$ that provide the eight level input to the perforator 10 and there are eleven code bar sensing levers 42$a$–42$k$. The two outside code bar sensing levers 42$a$ and 42$k$ do not have single upstanding tines 43 thereon as do the remaining code bar sensing levers that are associated with only one code bar extension. Rather, the outside code bar sensing levers 42$a$ and 42$k$ are associated with each level and have a tine 43 for sensing each code bar extension 20$a$–20$h$ since they must sense each level to determine whether or not the input signals constitute an answer-back code combination, as will be brought out more fully hereinafter. The code bar sensing lever 42$e$ has no upstanding tine thereon for sensing any of the code bar extensions 20$a$–20$h$ since this code bar sensing lever invariably functions to enable the tape feeding hole punching mechanism for punching a tape feed hole for each character received.

With the eight level code illustrated herein, an answer-back code combination has marking signals in the 0, 4, and 5 levels and has spacing signals in the 1, 2, 3, 6, and 7 levels. Accordingly, when an answer-back signal constitutes the input code combination for the perforator 10, the code bar extensions 20$a$, 20$e$, and 20$f$ corresponding to the 0, 4, and 5 levels will be moved to the left in FIGS. 2 and 4 and the remaining code bar extensions will remain in the positions shown in FIGS. 2 and 4.

Code bar extensions 20$a$, 20$e$, and 20$f$ have dependant tines 100 that extend downwardly from these code bar extensions and which are situated one position to the left of the dependant tine 41 of code bar extensions 20$a$, i.e., one position to the left of the tine designated by the numeral 0. Hence, when the code bar sensing lever 42$a$ moves upwardly it will sense whether or not the dependant tines 100 on code bar extensions 20$a$, 20$e$, and 20$f$, have moved one position to the left, and if they have so moved, the code bar sensing lever 42$a$ will be released for further upward movement unless blocked by a tine 101 carried on code bar extensions 20$b$, 20$c$, 20$d$, 20$g$ and 20$h$. The tines 101 are spaced one tine width to the right of the tines 100 and will not be sensed by the code bar sensing lever 42$a$ unless their respective code bar extensions are in a leftward or marking position. It should be noted that to prevent blocking of the code bar sensing lever 42$a$ by the tine (0) on code bar extension 20$a$ when the code bar extension 20$a$ moves to the left during an answer-back input code combination, the code bar sensing lever 42$a$ has a slot 120 therein for sensing code bar extension 20$a$ and a continuous upstanding tine bar 43 for sensing code bar extensions 20$b$–20$h$, inclusive. However, to block the code bar sensing lever 42$a$ when it remains in its rightward (spacing) position, the dependant tine 100 on code bar 20$a$ has been extended further downwardly than the dependant tines 100 on code bar extensions 20$e$ and 20$f$ to co-operate with recess 120 on code bar extension 20$a$. Thus, code bar sensing lever 42$a$ is able to sense each level without interference from tine (0) on code bar extension 20$a$.

While the code bar sensing lever 42$a$ is adequate to detect and recognize the presence of the answer-back signals, the code bar sensing lever 42$k$ also is used to detect these signals. The code bar sensing lever 42$k$ is positioned to the right of the dependant tine 41 on code bar extension 20$h$ and is positioned for engagement with a dependant tine 102 on any of the code bar extensions 20$a$, 20$e$, and 20$f$ when any one of them is in its spacing position and for engagement with a dependant tine 103 on code bar extensions 20$b$, 20$c$, 20$d$, 20$g$ and 20$h$ when any one of them moves to its marking position. The code bar sensing lever 42$k$ has a continuous upstanding tine bar 43 for sensing the code bar extensions 20$a$–20$h$. Thus, the code bar sensing levers 42$a$ and 42$k$ both perform the sensing and recognizing of the answer-back input signal.

Each of the code bar sensing levers 42$a$–42$k$ has an upwardly directed member 70 having a vertical face 71 in engagement with an opposed vertical face 72 on a depending latch pawl 73. A latch pawl 73 is associated with each of the code bar sensing levers 42$a$–42$k$ and upon sufficient upward movement of its associated sensing lever 42, a horizontal latching surface 74 on the associated latching pawl 73 is adapted to snap under horizontal latching shoulder 75 on the vertical member 70 of its code bar sensing lever. The vertical face 72 of the latch pawl 73 is biased into sliding engagement with the vertical face 71 on its associated upwardly directed member 70 by a contractile spring 76 hooked to the middle of the latching pawl 73 and tending to rotate the latching pawl 73 in a clockwise direction about its articulate connection 77 with an actuating lever 55.

The code bar sensing levers 42$a$ to 42$k$ are released to move upwardly under the influence of their associated springs 48 when a driving bail 56 moves in a counterclockwise direction (FIG. 1) due to its supporting bail arms 58 and 59 being rotated counterclockwise about their supporting shaft 60 by a driving link 63 attached to a crank arm 65 on a main power shaft 21. As the driving bail 56 moves counterclockwise all of the code bar sensing levers 42a–42k move upwardly to take up the clearance between the matched tines 41 and 43 and those of the code bar sensing levers 42a–42k sensing a dependant tine 41 matched with its upstanding tine 43 will be blocked and prevented from further upward movement. However, each of the code bar sensing levers 42a–42k that have sensed no matching dependant tine 41 will move further upwardly into a position where its latching shoulder 75 will be raised above the opposed latching shoulder 74 on its associated latching pawl 73 whereupon the associated latching pawl 73 will move counterclockwise about its articulate connection 77 under the influence of springs 76.

After the selected ones of the latching pawls 73 are latched to their associated code bar sensing levers 42a–42k, the main power shaft 21 will reverse its direction of rotation and, through driving link 63, pivot bail supporting arms 58 and 59 in a clockwise direction about supporting shaft 60 thereby moving the bail 56 downwardly and through driving lugs 57 driving the code bar sensing levers 42a–42k downwardly against the upward bias of their associated springs 48. Those of the code bar sensing levers 42a–42k that have a latching pawl 73 latched thereto pull their respective latching pawls 73 downward and rotate their respective actuating levers 55 about pivot supporting shaft 80. The latching pawls 73 and actuating levers 55 associated with code bar sensing levers 42b–42j, inclusive, cause attached punch pins 82 to move upwardly through punch block 88 to perforate the recording medium positioned between die block 85 and punch block 88.

The code bar sensing levers 42a and 42k having their associated latching pawls 73 articulately connected at 77 to actuating levers 55 which are of slightly different shape than the levers 55 associated with the other sensing levers extend downwardly and terminate beneath depending tines or lugs 106 on the actuating levers 55 for the punch pins 82. As seen in FIG. 3, the two actuating levers 55 associated with code bar sensing levers 42a and 42k carry a supplemental driving bail 111 that extends beneath and across all of the inner punch pin actuating levers 55.

Upon downward movement of the code bar sensing levers 42a and 42k, their associated actuating levers 55 pivot about shaft 80 in a counterclockwise direction and move driving bail 111 into driving engagement with driving lugs 106 forcing the punch pin actuating levers 55 to pivot counterclockwise about shaft 80 and reciprocate their punch pins 82 upwardly through the recording medium and into the die block 85. Inasmuch as the punch pins in the 0, 4 and 5 levels are selected for operation to record the input answer-back signal and since the feed hole punch pin is also actuated by its latch pawl during each cycle of operation, only those levels that would normally be recording a spacing condition during the recording of an answer-back signal have dependant lugs 106 thereon for driving engagement with the supplemental driving bail 111.

As shown in FIG. 3, the punch pin actuating levers 55 associated with the punch pins 82 in the 1, 2, 3, 6 and 7 levels are encoded with dependant lugs 106; and the actuating levers 55 associated with the 0, 4, 5 and feed hole levels are not encoded with dependant tines for engagement with supplemental driving bail 111. With this arrangement, all of the punch pins 82 are actuated to perforate a letters character when the input signal is an answer-back signal. However, the answer-back code could be altered to any other suitable code merely by encoding different ones of the punch pin actuating levers with driving lugs 106 for driving engagement with supplemental driving bail 111.

The operation of the code altering mechanism for a perforator receiving an answer-back signal will be briefly described to aid in the understanding of the invention.

As the selector mechanism in the page printer receives electrical signals and converts them into mechanical movements of the code bars 137 during the receipt of an answer-back signal, the code bar extensions 20a and 20e and 20f slide to the left as shown in FIGS. 2 and 4 and the remaining code bar extensions remain in their righthand positions shown in FIG. 2. The sliding movement of code bar extensions 20a, 20f and 20g reposition their downwardly extending tines 41, 100 and 102 so that the code bar sensing lever 42a is no longer blocked by their dependant tines 100 so that the code bar sensing lever 42k is no longer blocked by dependant tines 102. Similarly, the code bar sensing lever 42b is no longer blocked by the dependant tine 41 of code bar extension 20a; code bar sensing lever 42g is no longer blocked by depending tine 41 of code bar extension 20e, and code bar sensing lever 42h is no longer blocked by dependant tine 41 of code bar extension 20f.

The main power shaft 21 operates in timed relationship to the movement of the code bar extensions 20a–20h. The power shaft 21 begins its oscillation in the counterclockwise direction and through crank arm 65, driving link 63 and bail arms 58 and 59 rotates driving bail 56 counterclockwise. The counterclockwise rotation of bail 56, which is in engagement with the driving lugs 57 of the code bar sensing levers 42a–42k, permits code bar sensing levers 42a–42k to move upwardly as they rotate in the counterclockwise direction about their pivot shaft 45 under the urging of their springs 48. Since the tines 43 of the code bar sensing levers 42b, 42g and 42h are no longer matched with their respectively matched dependant tines 41 on code bar extensions 20a, 20e and 20f, respectively, these code bar sensing levers are selected and permitted to move further upward under the urging of their springs 48. Similarly, since the code bar sensing levers 42a and 42k, which recognize the "answer-back signal," are not matched with any of the tines 100 and 102 on any of the code bar extensions 20a–20h, the code bar sensing levers 42a and 42k also are selected and permitted to move further upwardly under the bias of their springs 48. However, the remaining code bar sensing levers 42c, 42d, 42f, 42i and 42j are blocked from further upward movement by downwardly extending tines 41 on their respective code bar extensions 20b, 20c, 20d, 20g and 20h.

As the selected ones of the code bar sensing levers move upwardly and raise their respective latching shoulders 75 above the horizontal surfaces 74 on their associated latching pawls 73, their associated latching pawls 73 move counterclockwise about their articulate connections 77 under the urging of springs 76 to snap into latching engagement with these selected code bar sensing levers.

After the latch pawls 73 are latched to the selected sensing levers, the main power shaft 21 begins to reverse its direction of rotation and through driving link 63 and bail arms 58 and 59 causes the driving bail 56 to reverse its direction of rotation and move downwardly as viewed in FIG. 1. The driving bail 56 moves downwardly, and it engages the driving lugs 57 of those ones of code bar sensing levers 42 that have been selected and latched causing them to pull their associated latching pawls 73 downward; and these latching pawls, in turn, rotate their associated actuating levers 55 in the counterclockwise direction about supporting shaft 80 and push attached punch pins 82 upwardly through the record medium and into the die block 85.

Downward movement of the two latch pawls 73 latched to the code bar sensing levers 42a and 42k, respectively, causes their respective actuating levers 55 to pivot about shaft 80 and to move the supplemental driving bail 111 upwardly into driving engagement with the lugs 106 on those of the punch pin actuating levers 55 encoded with lugs 106.

The supplemental driving bail 111 rotates these punch pin actuating levers 55, having dependant lugs 106, upwardly to reciprocate their attached punch pins 82 through the recording medium to perforate the first, second, third, sixth, and seventh levels of the tape, which together with the perforations formed by the selected punch pins in the zero, fourth, and fifth levels, constittue a recording of a letters code combination rather than a recording of an answer-back combination.

After the punching operation, main power shaft 21 reverses its direction of rotation and bail 56 moves upwardly as it turns in a counterclockwise direction. At this time a stripping bail 92 moves into engagement with notched surfaces 94 on the latch pawls 73 and rotates the latch pawls 73 about their articulate connections 77 with their actuating levers 55 so that the horizontal latching surfaces 74 are disengaged from the latching shoulders 75 on the code bar sensing levers. Springs 48 and 76 in co-operation with the stripping bail 92 and acting through actuating levers 55 move the latching pawls 73 upwardly.

As the main driving bail 56 reaches its stop position, it comes to rest and awaits the receipt of the next character. The driving lugs 57 are in engagement with driving bail 56 and hold the code bar sensing levers **42*a*–42*k* in the position shown in FIG. 1 and springs 76 urge the vertical surfaces 72 into engagement with the vertical surfaces 71 of the code bar sensing levers. All of the code bar extensions 20*a*–20*h*** are returned to their non-released or spacing positions and await the next character selection.

From the foregoing it should be apparent that code bar sensing levers **42*a* and 42*k*** function to recognize a given input code combination and by operating a supplemental driving bail cause operation of additional punches to perforate additional perforations in the tape to record a code combination other than that which served as the input code combination. Hence, a code combination can be effectively deleted by operating punches in addition to those associated with the input code combination.

Although only one embodiment of the invention is shown in the drawings and described in the foregoing specification it will be understood that the invention is not limited to the specific embodiment described, but is capable of modification and rearrangement and substtitution of parts and elements without departing from the spirit of the invention.

What is claimed is:

1. In a perforator having a plurality of punches movable to perforate a recording medium,
   (*a*) a plurality of punch actuating means, each of said punch actuating means operable to actuate a punch to perforate the record medium,
   (*b*) a plurality of signal responsive elements selectively movable in response to an input code combination,
   (*c*) means for sensing said signal responsive elements and for selectively operating said punch actuating means in accordance with the input code combination, and
   (*d*) means for recognizing a given code combination and invariably operable upon recognition of that particular given code combination to operate at least one additional punch actuating means to perforate an additional perforation simultaneously with the perforations representing said given code combination thereby recording another code combination instead of the given code combination.

2. In a perforator having a plurality of punches to perforate a recording medium,
   (*a*) a plurality of punch pin actuating means, each of said punch pin actuating means operable to actuate a punch to perforate a recording medium,
   (*b*) a plurality of signal responsive elements selectively movable in response to an input code combination,
   (*c*) a main power means effective to drive said punch pin actuating means,
   (*d*) a normally ineffective supplemental power means for driving selected ones of said punch pin actuating means and
   (*e*) means for sensing said signal responsive elements and for selectively activating said punch actuating means in accordance with the input code combination, said sensing means operable upon the sensing of a given code combination to render effective said supplemental power means.

3. The perforator of claim 2, wherein said supplemental power means for said punch pins is a reciprocable bail and wherein said selected ones of said punch pin actuating means have means engageable by said reciprocable bail thereby actuating their respective punch pins to perforate said recording medium.

4. In a perforator having a plurality of punches to perforate a recording medium,
   (*a*) a plurality of punch pin actuating means, each of said punch pin actuating means operable to actuate a punch to perforate a recording medium,
   (*b*) a plurality of signal responsive elements selectively movable in response to an input code combination,
   (*c*) a main power means effective to drive said punch pin actuating means,
   (*d*) a normally ineffective supplemental power means for driving selected ones of said punch pin actuating means, and
   (*e*) means on selected ones of said punch actuating means co-operable with said supplemental power means to actuate their punches to perforate the recording medium when a given code combination is sensed by said sensing means.

5. In a record perforating mechanism,
   (*a*) a cyclically operable power means,
   (*b*) a plurality of elements permutatively settable in response to an input code combination,
   (*c*) a plurality of sensing means, each of said sensing means associated with an element and releasable by said power means to sense the position of its associated element,
   (*d*) a latching surface on each of said sensing means,
   (*e*) a plurality of reciprocable punch pins for perforating a recording medium,
   (*f*) a plurality of latch pawls for latching engagement with said latching surface on said sensing means,
   (*g*) a plurality of punch pin actuating levers interconnecting said latch pawls and said punch pins,
   (*h*) tine means on predetermined ones of said punch pin actuating levers, and
   (*i*) means driven by said power means when said sensing means senses a given code combination for engaging said tines on said predetermined punch pin actuating levers thereby perforating perforations in addition to the perforations constituting said input code combination.

6. In a perforator for punching a record medium with perforations corresponding to input combinations of signals, the improvement comprising apparatus for recognizing a "who are you" input combination of signals and for altering the "who are you" code combination recorded in the recording medium by adding additional perforations to the "who are you" code combination, said apparatus comprising
   (*a*) a plurality of punch pins,
   (*b*) a plurality of selectively movable input elements responsive to input signals,
   (*c*) actuating means responsive to said input elements to actuate said punch pins to perforate the recording medium in accordance with the combination of input signals, and (*d*) a supplemental actuating means for said punch pins operable in response to a "who are you" input code combination of signals to actuate additional punch pin actuating means to perforate additional perforations in said recording medium thereby altering the recording of the "who are you" combination of signals.

References Cited in the file of this patent

UNITED STATES PATENTS

| | | |
|---|---|---|
| 2,456,726 | Neuhaus | Dec. 21, 1948 |
| 2,980,225 | Intagliata et al. | Apr. 18, 1961 |
| 3,050,241 | Hickerson | Aug. 21, 1962 |